(12) United States Patent
Ng et al.

(10) Patent No.: US 8,821,659 B2
(45) Date of Patent: Sep. 2, 2014

(54) APPARATUS AND METHOD FOR REAL-TIME ALIGNMENT AND LAMINATION OF SUBSTRATES

(75) Inventors: Man Chung Ng, Hong Kong (CN); Man Lai Chau, Hong Kong (CN)

(73) Assignee: ASM Technology Singapore Pte Ltd, Singapore (SG)

( * ) Notice: Subject to any disclaimer, the term of this patent is extended or adjusted under 35 U.S.C. 154(b) by 131 days.

(21) Appl. No.: 13/470,736

(22) Filed: May 14, 2012

(65) Prior Publication Data
US 2013/0299062 A1 Nov. 14, 2013

(51) Int. Cl.
*B32B 41/00* (2006.01)
*G02F 1/1333* (2006.01)

(52) U.S. Cl.
CPC .......... *G02F 1/1333* (2013.01); *G02F 1/13336* (2013.01); *G02F 2001/133354* (2013.01)
USPC ............ 156/64; 156/350; 156/351; 156/358; 156/360; 156/362; 156/363; 156/367; 156/378; 156/379

(58) Field of Classification Search
CPC .............. G02F 1/1333; G02F 1/13336; G02F 2001/133354
USPC .......... 156/64, 350, 351, 358, 360, 362, 363, 156/367, 378, 379
See application file for complete search history.

(56) References Cited

U.S. PATENT DOCUMENTS

| | | | |
|---|---|---|---|
| 2008/0011418 A1* | 1/2008 | Takabayashi | 156/324 |
| 2008/0139074 A1* | 6/2008 | Choi et al. | 445/25 |

* cited by examiner

*Primary Examiner* — Katarzyna Wyrozebski Lee
*Assistant Examiner* — Joshel Rivera
(74) *Attorney, Agent, or Firm* — Ostrolenk Faber LLP

(57) ABSTRACT

Real-time alignment of substrates is conducted by way of placing a first substrate together with a second substrate located over the first substrate in a fixed relative position onto a first substrate holder. The first substrate holder is operative to support the first substrate. A second substrate holder is operative to contact and control the position of the second substrate relative to the first substrate. A pattern recognition system is operative to view reference marks on the first and second substrates for determining their relative alignment, and a positioning mechanism coupled to the first substrate holder and/or the second substrate holder will align the first substrate relative to the second substrate based on their relative alignment as determined by the pattern recognition system. Thereafter, the substrates are fully laminated to secure them to each other.

17 Claims, 7 Drawing Sheets

APPARATUS AND METHOD FOR REAL-TIME ALIGNMENT AND LAMINATION OF SUBSTRATES

FIELD OF THE INVENTION

The invention relates to the accurate bonding of substrates to each other, and in particular to alignment of the substrates during bonding.

BACKGROUND AND PRIOR ART

There are various applications in the semiconductor industry where two substrates in the form of flat panels have to be bonded together. Typically, at least one of the panels would be made of glass. For instance, for producing touch-screen display panels, two glass panels may have to be bonded together. Another common application is where a protective glass layer is bonded onto a semiconductor wafer in the making of solar panels. An adhesive such as epoxy is typically used to seal the two substrate panels together for downstream processing. Some applications such as the production of touch panels generally require relatively lower bonding accuracy, whereas other applications such as the production of liquid crystal display ("LCD") panels require relatively higher bonding accuracy.

FIG. 1 is a process flow chart which illustrates a conventional bonding sequence for laminating substrates. Separate substrates are first input into a lamination machine 100. The substrates are aligned relative to each other using mechanical alignment 102, that is, there are mechanical features in the lamination machine 100 such as reference stoppers to orientate the substrates relative to each other. An adhesive is dispensed 104 onto at least one of the substrates. Thereafter, lamination 106 is conducted wherein the substrates are bonded to each other, before the laminated substrate is removed from the lamination machine 100.

FIGS. 2a to 2d schematically illustrate a conventional bonding sequence for laminating substrates. First and second substrates 118, 120 are loaded onto respective holding tables 112, 114 of the lamination machine 100. The positions of the substrates 118, 120 are aligned by mechanical features, such as stoppers 116. A dispensing apparatus 121 that can be driven in the X, Y and Z directions will dispense an adhesive resin 122 in a predetermined pattern onto the first substrate 118. A transport device 124 will carry the second substrate 120 to a position above the first substrate 118 such that inner surfaces of the substrates 118, 120 oppose each other. The holding table 112 will be raised relative to the second substrate 120 until a required resin thickness is reached. Then, the holding table 112 will be lowered together with the laminated substrate 126. The laminated substrate 126 will be unloaded and transported to an external curing system 128 where the resin is cured by a curing device 130 in order to bond and secure the laminated substrate 126.

It would be noted that the positions of the separate substrates 118, 120 are guided by mechanical stoppers 116. The placement accuracy will be affected by limitations of mechanical alignment, such as the variations in sizes of the substrates 118, 120 due to imprecise manufacturing.

The problem with the above approach of the prior art is that the bonding accuracy of the panel bonding machines depends mainly on the precision of the guiding jig. That gives rise to inaccuracy because substrate sizes are inconsistent, even among the same production lot. Without the aid of a real-time pattern recognition system to rectify any positional error, the placement quality is difficult to assure since it is sensitive to material variation.

SUMMARY OF THE INVENTION

It is thus an object of the invention to seek to provide an apparatus and method for bonding panel substrates that is capable of achieving high bonding accuracy for the lamination of substrates by monitoring and adjusting relative positions of the substrates in real time before they are fully bonded.

According to a first aspect of the invention, there is provided an apparatus for real-time alignment and lamination of substrates, comprising: a first substrate holder configured for receiving a first substrate together with a second substrate located over the first substrate in a fixed relative position, the first substrate holder being operative to support the first substrate; a second substrate holder that is operative to contact and control the position of the second substrate relative to the first substrate; a pattern recognition system operative to view reference marks on the first and second substrates for determining their relative alignment; and a positioning mechanism coupled to the first substrate holder and/or the second substrate holder for aligning the first substrate relative to the second substrate based on their relative alignment as determined by the pattern recognition system.

According to a second aspect of the invention, there is provided a method for real-time alignment and lamination of substrates, comprising the steps of: placing onto a first substrate holder a first substrate together with a second substrate located over the first substrate in a fixed relative position, wherein the first substrate holder supports the first substrate; contacting the second substrate with a second substrate holder so as to control the position of the second substrate relative to the first substrate; viewing reference marks on the first and second substrates with a pattern recognition system for determining their relative alignment; and aligning the first substrate relative to the second substrate with a positioning mechanism coupled to the first substrate holder and/or the second substrate holder based on their relative alignment as determined by the pattern recognition system.

It would be convenient hereinafter to describe the invention in greater detail by reference to the accompanying drawings which illustrate one preferred embodiment of the invention. The particularity of the drawings and the related description is not to be understood as superseding the generality of the broad identification of the invention as defined by the claims.

BRIEF DESCRIPTION OF THE DRAWINGS

The present invention will be readily appreciated by reference to the detailed description of the preferred embodiments of the invention when considered with the accompanying drawings, in which.

DETAILED DESCRIPTION OF THE PREFERRED EMBODIMENT OF THE INVENTION

Figure 1:
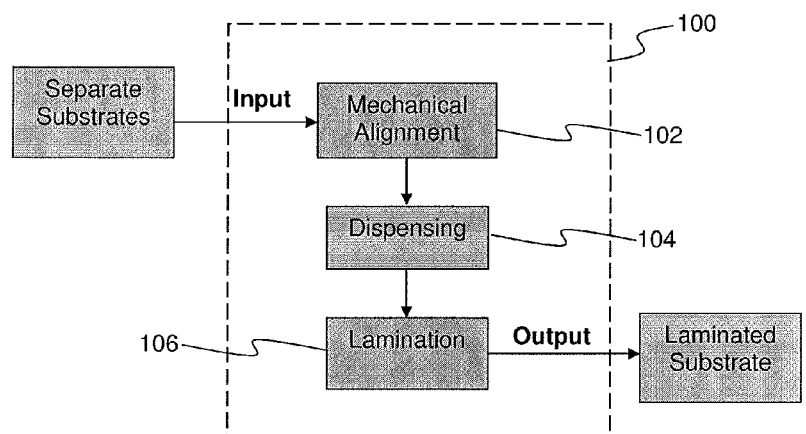
FIG. 1 is a process flow chart which illustrates a conventional bonding sequence for laminating substrates.
Figure 2A:
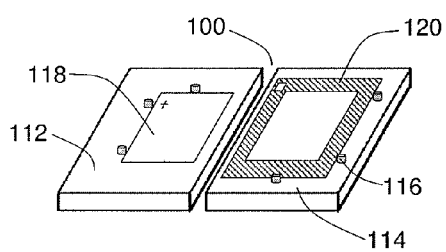
FIGS. 2a to 2d schematically illustrate a conventional bonding sequence for laminating substrates.
Figure 2B:
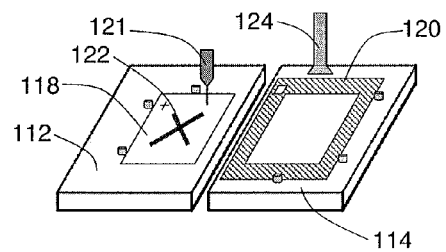
Figure 2C:
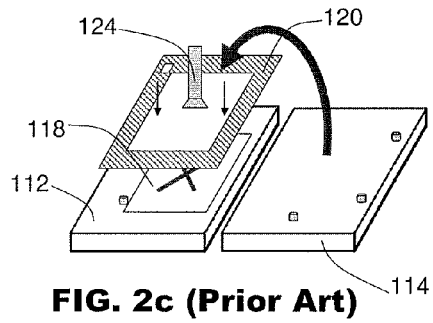
Figure 2D:
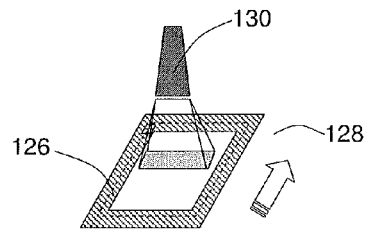
Figure 3:
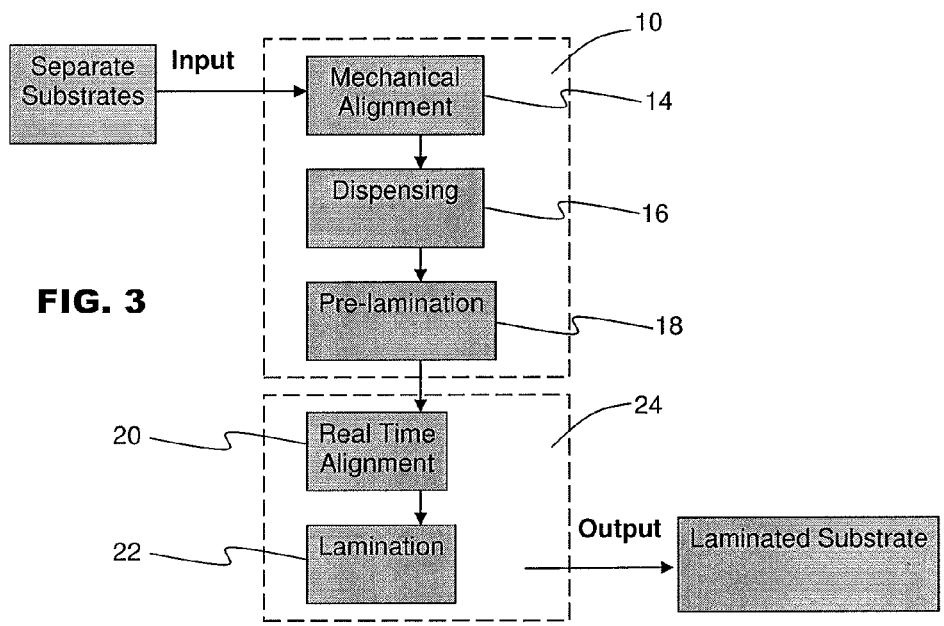
FIG. 3 is a process flow chart of a bonding process for laminating substrates according to the preferred embodiment of the invention.

FIG. 3 is flow chart of a lamination process according to the preferred embodiment of the invention. An additional real-time alignment station 24 for performing real time alignment is added after a lamination machine 10, which may comprise a conventional lamination machine with suitable modifications as described below.

In general, separate substrates are first introduced into the lamination machine 10. Mechanical alignment 14 is performed to align the substrates relative to each other. An adhesive resin is then dispensed 16 onto at least one of the substrates. Thereafter, pre-lamination 18 is conducted, wherein the substrates are partially bonded to each other but are not fully bonded.

After pre-lamination 18, the substrates are weakly attached to each other but may still be shifted relative to each other by the application of a force that is applied sideways. The substrates are transferred to a real-time alignment station 24 where real-time alignment is performed to ensure that the substrates are aligned with each other with the desired level of accuracy. After the substrates have been finely-aligned, they are fully bonded to each other by full lamination 22. Finally, the laminated substrate may be removed from the real-time alignment station 24.

Figure 4:
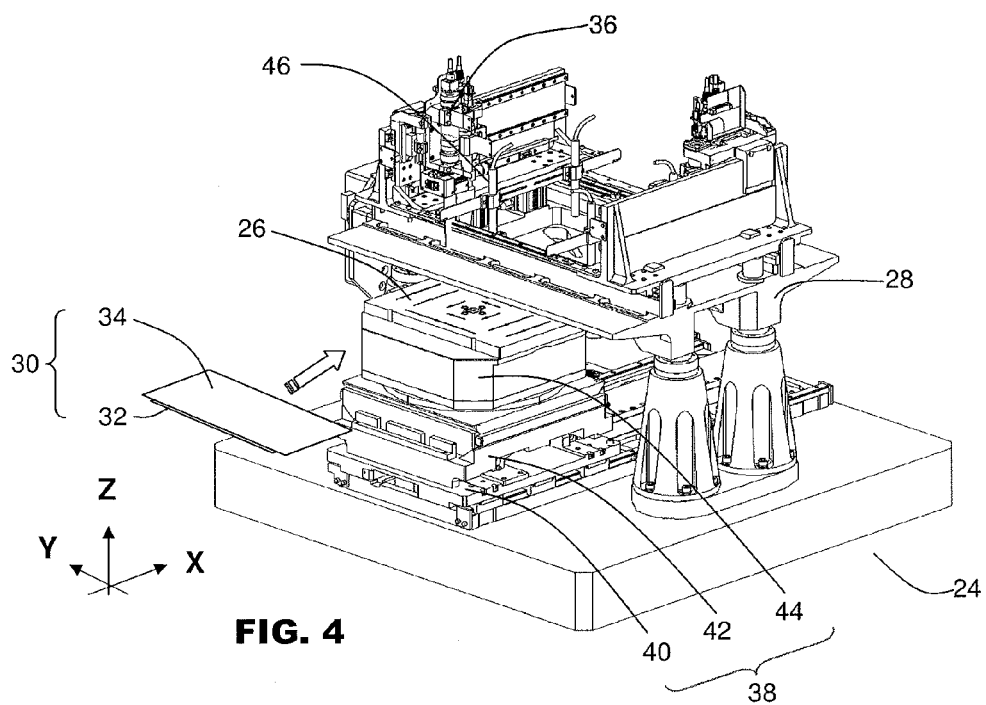
FIG. 4 is an isometric view of a real-time alignment apparatus according to the preferred embodiment of the invention.

FIG. 4 is an isometric view of a real-time alignment apparatus 24 according to the preferred embodiment of the invention. It generally comprises a first substrate holder such as a lower holding table 26 and a second substrate holder such as an upper holding table 28. After the pre-lamination 18 process, a partially laminated substrate 30, comprising a second substrate 34 partially bonded to a first substrate 32 in a fixed relative position, will be transferred together to the real-time alignment apparatus 24 by a transportation device (not shown).

The positions of the substrates 32, 34 will be monitored in real time by a pattern recognition system 36. Any positional error between the positions of the first and second substrates 32, 34 that is determined by the pattern recognition system 36 will be corrected by moving the lower holding table 26, which is coupled to a positioning mechanism in the form of a positioning table 38. The positioning table 38 comprises an X table 40, a Y table 42 mounted on the X table 40, and a theta table 44 which is mounted on the Y table 42, such that an orientation of the first substrate 32 is adjustable along a plane and about a rotational axis perpendicular to the plane (i.e. in X, Y and theta directions) according to the movement of the respective tables 40, 42, 44. This correction method will continue until the placement accuracy is within a required specification. The adhesive resin will be substantially cured by curing devices 46 such that the relative positions of the two substrates 32, 34 can be secured more fully before leaving the real-time alignment apparatus 24. Alternatively, the positioning table 38 may be coupled to the upper holding table 28 or to both the lower holding table 26 and upper holding table 28 for aligning the first and second substrates 32, 34.

FIGS. 5a to 5j illustrate schematically a bonding process for laminating substrates according to a first preferred embodiment of the invention.

Figure 5A:
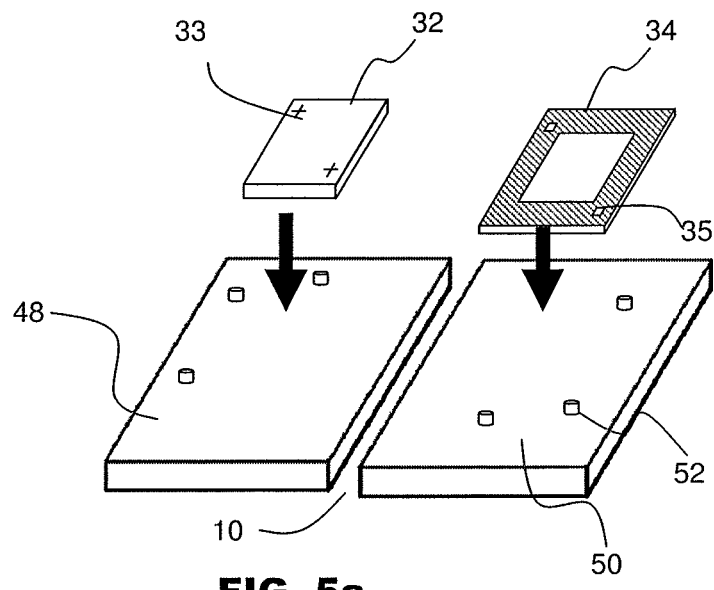
FIGS. 5a to 5j illustrate schematically a bonding process for laminating substrates according to a first preferred embodiment of the invention.

In FIG. 5a, first and second substrates 32, 34 are loaded onto respective holding tables 48, 50 of the lamination machine 10. The positions of the substrates 32, 34 are aligned by mechanical features, such as stoppers 52. The substrates 32, 34 further contain respective reference marks or fiducial marks 33, 35 at the corners of the substrates 32, 34 to allow visual alignment of the substrates 32, 34 after mechanical alignment utilizing the stoppers 52.

Figure 5B:
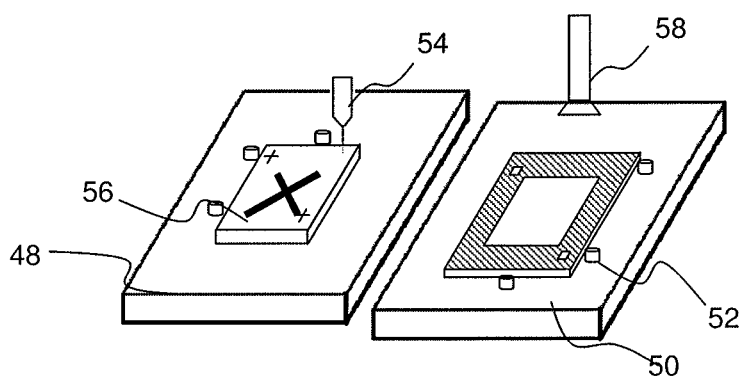
Figure 5C:
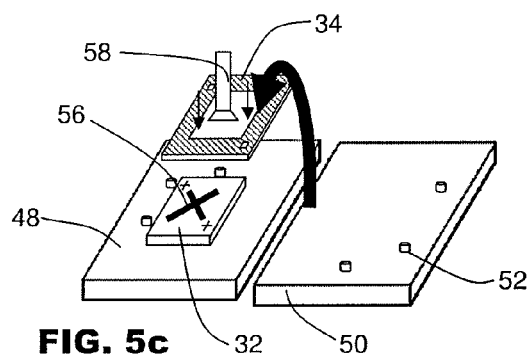

In FIG. 5b, the substrates 32, 34 have been mechanically aligned relative to each other by biasing the substrates 32, 34 against the respective stoppers 52. A dispensing apparatus 54 that can be driven in the X, Y and Z directions dispenses an adhesive in the form of an adhesive resin 56 in a predetermined pattern onto the first substrate 32. In FIG. 5c, a transport device 58 carries the second substrate 34 to a position above the first substrate 32 such that inner surfaces of the substrates 32, 34 oppose each other, and the second substrate 34 is placed onto the first substrate 32 with the adhesive resin 56 sandwiched between the first and second substrates 32, 34. The substrates 32, 34 are then partially laminated by curing devices 60 as shown in FIG. 5d.

Figure 5D:
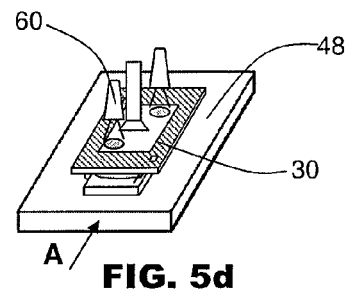
Figure 5E:
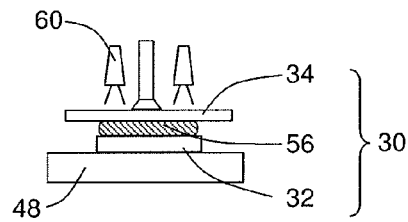
Figure 5F:
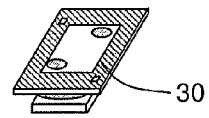

Unlike the prior art in which the whole resin area is fully cured, FIG. 5d shows that only a portion of the resin is cured by the curing devices 60 to such an extent that its bonding strength is just strong enough to hold the first and second substrates 32, 34 together during transportation to the real-time alignment apparatus 24 for undergoing the real-time alignment process. The substrates 32, 34 are weakly attached to each other such that they may still be shifted relative to each other by an application of an external force. FIG. 5e shows a side view of the adhesive resin 56 being partially cured by the curing devices 60 while the first substrate 32 is being supported by the lower holding table 48. FIG. 5f is an isometric view of the laminated substrate 30 which has been partially cured at diagonally-opposite corners of an interface between the first and second substrates 32, 34.

Figure 5G:
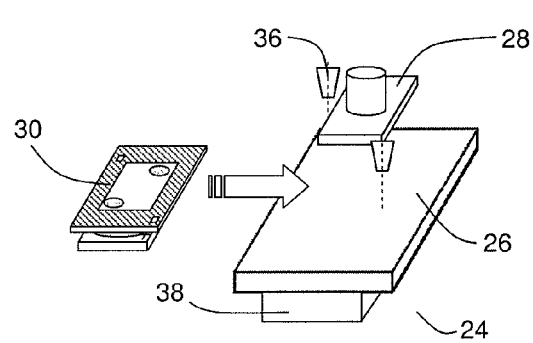
Figure 5H:
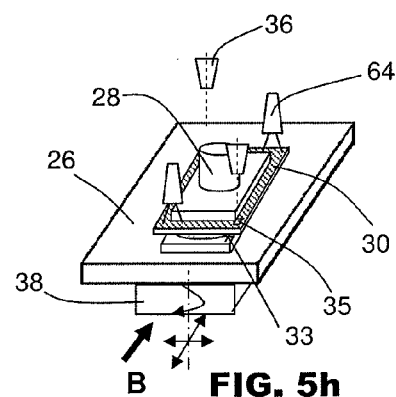
Figure 5I:
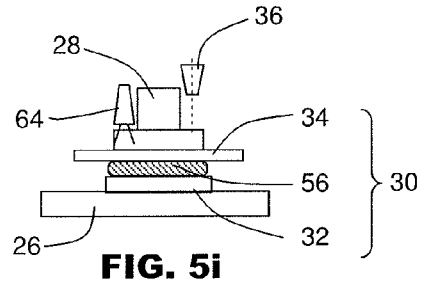
Figure 5J:
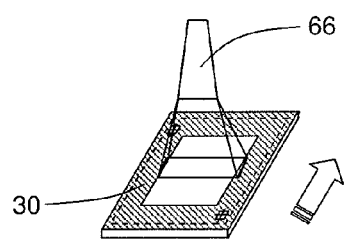

FIGS. 5g to 5i show the processes that take place in the real-time alignment apparatus 24. In FIG. 5g, the basic components of the real-time alignment apparatus 24 are shown, namely a lower holding table 26, a upper holding table 28 and a pattern recognition system 36. The laminated substrate 30 is loaded into the real-time alignment apparatus 24 and the first substrate 32 of the laminated substrate 30 is supported and held firmly by the lower holding table 26. A holding force to hold the first substrate 32 of the laminated substrate 30 firmly can be provided by vacuum suction. The upper holding table 28 will be lowered until it contacts a top surface of the laminated substrate 30. A vacuum suction device on the upper holding table 28 is also turned on, which secures the second substrate 34 of the laminated substrate 30 to the upper holding table 28 in order to control the position of the second substrate 34 relative to the first substrate 32.

The pattern recognition system 36 then detects the positions of the fiducial marks 33, 35 on the first substrate 32 and the second substrate 34. After determining the offsets of these fiducial marks 33, 35, the positioning table 38 will be actuated and moved in the X, Y and θ directions in order to correct the corresponding offsets. This adjustment will continue until the specified placement accuracy is achieved. Thereafter, the laminated substrate 30 will be further cured by the curing devices 64 at the real-time alignment apparatus 24 to substantially secure the first and second substrates 32, 34 to each other before being transported to another external station 66 for full curing.

Figure 6:
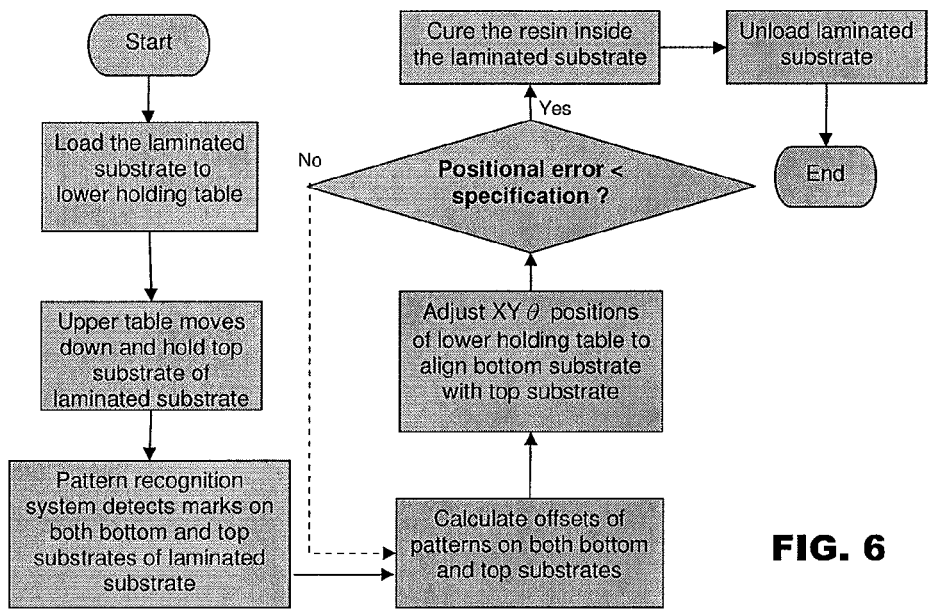
FIG. 6 is a flow chart illustrating a real-time alignment process.

FIG. 6 is a flow chart illustrating a real-time alignment process. A laminated substrate 30 with first and second substrates 32, 34 fixed relative to each other is introduced to a lower holding table 26. The upper holding table 28 moves down and holds the second substrate 34 of the laminated substrate 30 at a level corresponding to a predefined or desired resin thickness. A pattern recognition system 36 detects fiducial marks 33, 35 on both the first and second substrates 32, 34 and calculates the offsets of the fiducial marks 33, 35 of the respective substrates from each other.

The X, Y and theta positions of the lower holding table 26 are adjusted to align the fiducial marks 33, 35 with one another, until the substrates 32, 34 are accurately aligned so that any positional error is determined to be less than a specified offset. If not, the adjustment continues. After alignment, the adhesive resin 56 in the laminated substrate 30 is cured to harden. The laminated substrate 30 may then be unloaded from the real-time alignment apparatus 24.

FIGS. 7a to 7j illustrate schematically a bonding process for laminating substrates according to a second preferred embodiment of the invention.

Figure 7A:
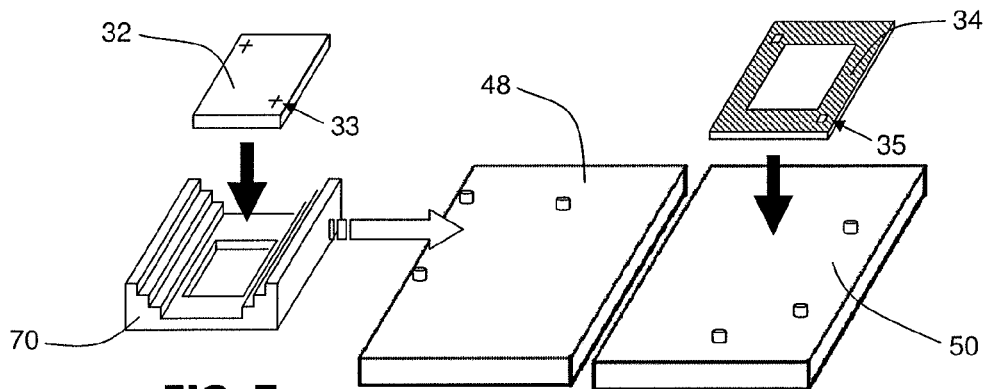
FIGS. 7a to 7j illustrate schematically a bonding process for laminating substrates according to a second preferred embodiment of the invention.
Figure 7B:
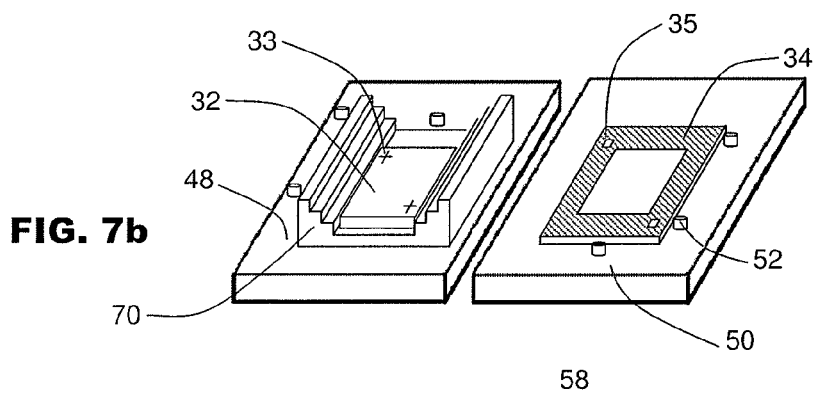

In FIG. 7a, a first substrate 32 is loaded onto a carrier 70 having stepped support surfaces, whereas a second substrate 34 is loaded onto a holding table 50 of the lamination machine 10. In FIG. 7b, the carrier 70 onto which the first substrate 32 has been loaded is mounted onto another holding table 48. The positions of the substrates 32, 34 are aligned by mechanical features, such as stoppers 52.

The first substrate 32 is thus aligned via alignment of the carrier 70 on the holding table 48. The substrates 32, 34 contain respective fiducial marks 33, 35 at the corners of the substrates 32, 34 to allow further visual alignment of the substrates 32, 34 after alignment utilizing the stoppers 52.

Figure 7C:
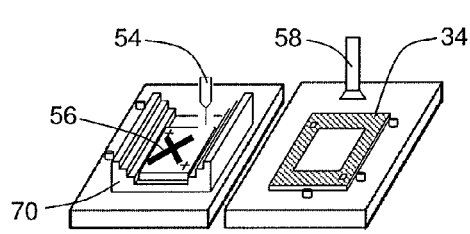
Figure 7D:
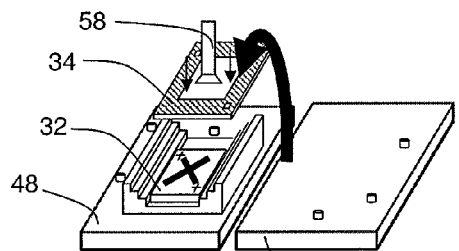
Figure 7E:
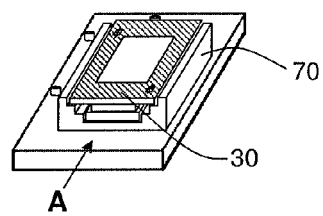

In FIG. 7c, the substrates 32, 34 have been mechanically aligned relative to each other by biasing the first substrate 32 and the carrier 70 against the respective stoppers 52. A dispensing apparatus 54 that can be driven in the X, Y and Z directions dispenses an adhesive resin 56 in a predetermined pattern onto the first substrate 32. In FIG. 7d, a transport device 58 carries the second substrate 34 to a position above the first substrate 32 such that inner surfaces of the substrates 32, 34 oppose each other. The second substrate 34 is placed onto the first substrate 32 such that a required resin thickness is reached (see FIG. 7e). The first and second substrates 32, 34 are supported by separate stepped surfaces of the carrier 70 which are located at different heights. The resin thickness may be achieved by controlling a height difference between adjacent stepped surfaces of the carrier 70 to correspond to a desired separation of the substrates 32, 34 that is to be achieved when both substrates 32, 34 are supported by separate stepped surfaces of the carrier 70.

Figure 7F:
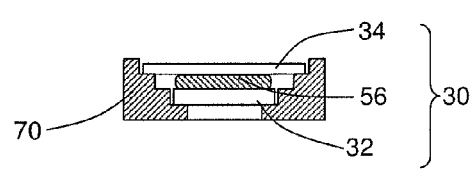

FIG. 7f is a side view of the carrier 70 supporting the substrates 32, 34, with a layer of adhesive resin 56 of the required thickness between inside surfaces of the substrates 32, 34.

Figure 7G:
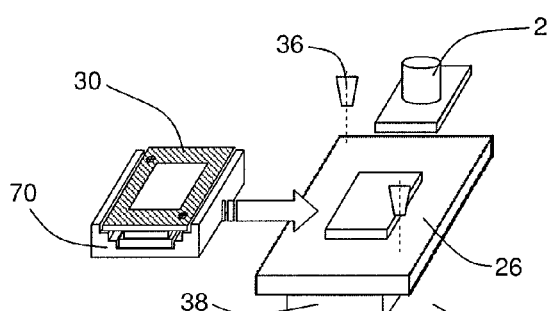
Figure 7H:
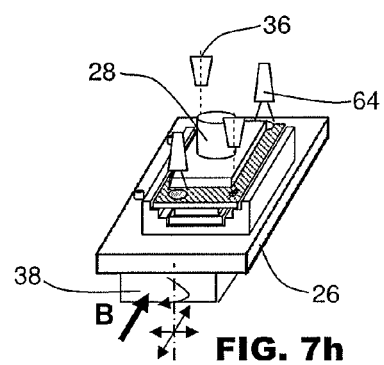
Figure 7I:
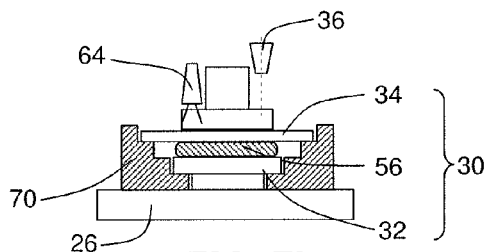
Figure 7J:
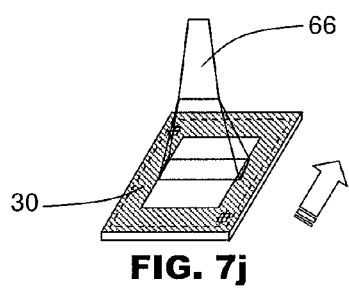

FIGS. 7g to 7i show the processes that take place in the real-time alignment apparatus 24. In FIG. 7g, the carrier 70 supporting the substrates 32, 34 is introduced into the real-time alignment apparatus 24 and is placed onto the lower holding table 26, which is configured for receiving the carrier 70. The carrier 70 is held firmly by the lower holding table 26, such as by vacuum suction. In FIG. 7h, the upper holding table 28 is lowered until it contacts a top surface of the second substrate 34. A vacuum suction device on the upper holding table 28 is also turned on, which secures the second substrate 34 to the upper holding table 28.

The pattern recognition system 36 then detects the positions of the fiducial marks 33, 35 on the first substrate 32 and the second substrate 34. After determining the offsets of these fiducial marks 33, 35, the positioning table 38 will be actuated and moved in the X, Y and θ directions in order to correct the corresponding offsets of the fiducial markers 33, 35. This adjustment will continue until the specified placement accuracy is achieved. Thereafter, the substrates 32, 34 are cured by the curing devices 64 to form a laminated substrate 30 at the real-time alignment apparatus 24 before being transported to another external station 66 for full curing.

The difference between the first and second preferred embodiments of the invention is the method of transporting the laminated substrate 30 into the real-time alignment apparatus 24. In the second preferred embodiment, the laminated substrate 30 is supported by a carrier 70 (FIG. 7g) in order to relatively fix the positions of the first and second substrates 32, 34 when it is introduced to the real-time alignment apparatus 24, instead of being partially cured when it is introduced into the real-time alignment station (FIG. 5g).

Figure 8:
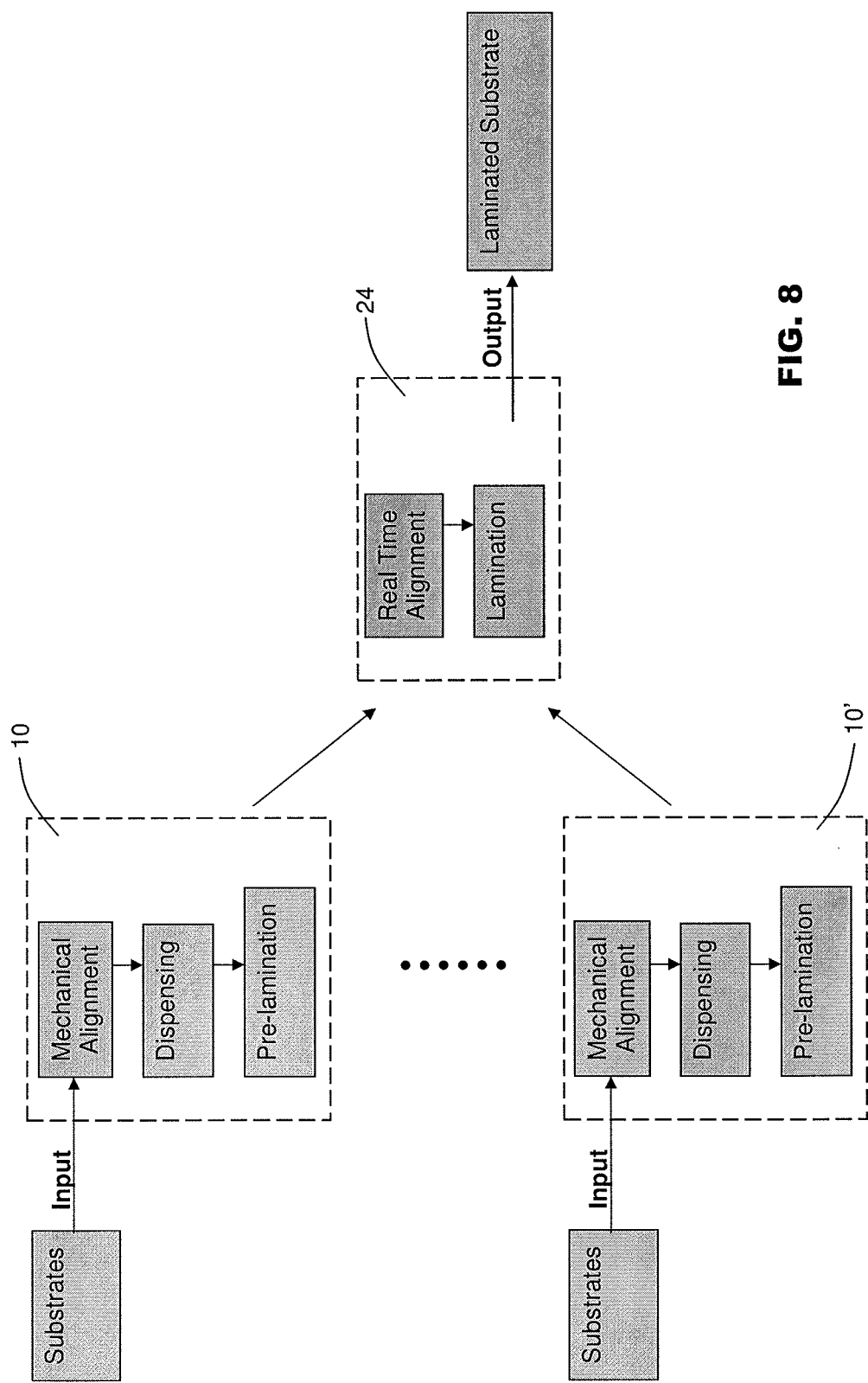
FIG. 8 illustrates the cascading of a plurality of lamination machines with respect to a single real time alignment apparatus.

FIG. 8 illustrates the cascading of a plurality of lamination machines 10, 10' with respect to a single real-time alignment apparatus 24. A mechanical handler is incorporated to transfer pre-laminated substrates 30 as described in the first preferred embodiment of the invention from the lamination machines 10, 10' to the real-time alignment apparatus 24. Each lamination machine 10, 10' is operative to provide respective first and second substrates 32, 34 that are in fixed relative positions to the single real-time alignment apparatus 24.

The real-time alignment apparatus 24 may thus be constructed as a standalone station which may be shared by a plurality of lamination machines 10, 10' instead of having dedicated real-time alignment apparatus 24 integrated to only one lamination machine 10 each. Multiple lamination machines 10, 10' working together and sharing a real time alignment apparatus 24 for placement improvement may further improve overall cycle time since the real-time alignment process may proceed more quickly than the substrate bonding process.

It should be appreciated that the lamination bonding accuracy achieved by the lamination machine according to the preferred embodiment of the invention is improved as compared to the prior art regardless of variations in the sizes of substrates.

Since the time required for real-time alignment is relatively short as compared to the dispensing and lamination processes, it is possible to have a standalone real-time alignment apparatus 24 to serve several lamination machines 10, 10'. Laminated substrates from different lamination machines 10, 10' will be transported to one real-time alignment apparatus 24 for positional re-alignment.

Therefore, the lamination machine can further help to improve placement accuracy without discarding conventional lamination systems by cascading the conventional lamination systems with a standalone real-time alignment apparatus.

The invention described herein is susceptible to variations, modifications and/or additions other than those specifically described and it is to be understood that the invention includes all such variations, modifications and/or additions which fall within the spirit and scope of the above description.

The invention claimed is:
1. An apparatus for real-time alignment and lamination of substrates, the apparatus comprising:
a first substrate holder configured for receiving a first substrate together with a second substrate located over the first substrate in a fixed relative position, the first substrate holder being operative to support the first substrate;

a second substrate holder that is operative to contact and control the position of the second substrate relative to the first substrate;

a pattern recognition system operative to view reference marks on the first and second substrates for determining their relative alignment; and a positioning mechanism coupled to the first substrate holder and/or the second substrate holder for aligning the first substrate relative to the second substrate based on their relative alignment as determined by the pattern recognition system, and a lamination machine operative:
to mount the first substrate onto a carrier comprising stepped support surfaces located at different heights;
to dispense an adhesive onto at least one of the first and second substrates; and
to locate the second substrate over the first substrate with the adhesive between the first and second substrates so that the first and second substrates are supported by separate stepped support surfaces of the carrier, before the first substrate together with the second substrate are introduced to the first substrate holder.

2. The apparatus as claimed in claim 1, further comprising a curing device for curing an adhesive sandwiched between the first and second substrates, and substantially securing the first and second substrates to each other after they have been aligned by the positioning mechanism.

3. The apparatus as claimed in claim 1, wherein the positioning mechanism comprises positioning tables that are operative to move the first substrate holder relative to the second substrate holder along a plane, and about a rotational axis perpendicular to the plane.

4. The apparatus as claimed in claim 1, further comprising a lamination machine which is operative:
to dispense an adhesive onto at least one of the first and second substrates;
to locate the second substrate over the first substrate with the adhesive between the first and second substrates; and
to weakly attach the second substrate to the first substrate by partially curing the adhesive so that the first and second substrates may still be shifted relative to each other by an application of an external force, before the first substrate together with the second substrate are introduced to the first substrate holder.

5. The apparatus as claimed in claim 4, wherein the lamination machine includes a curing device which is configured to cure selected localized regions of the adhesive.

6. The apparatus as claimed in claim 5, wherein the selected localized regions of the adhesive are located substantially at diagonally-opposite corners of an interface between the first and second substrates.

7. The apparatus as claimed in claim 1, wherein a height difference between the separate stepped surfaces supporting the first and second substrates is configured to correspond to a desired thickness of the adhesive between the first and second substrates during lamination.

8. The apparatus as claimed in claim 1, wherein the first substrate holder is configured for receiving the carrier supporting the first substrate together with the second substrate.

9. The apparatus as claimed in claim 1, wherein the apparatus comprises a standalone station and a plurality of lamination machines are cascaded with respect to the standalone station, each lamination machine being operative to provide respective first and second substrates that in fixed relative positions to the standalone station.

10. A method for real-time alignment and lamination of substrates, the method comprising the steps of:
placing onto a first substrate holder a first substrate together with a second substrate located over the first substrate in a fixed relative position, wherein the first substrate holder supports the first substrate;
contacting the second substrate with a second substrate holder so as to control the position of the second substrate relative to the first substrate;
viewing reference marks on the first and second substrates with a pattern recognition system for determining their relative alignment; and
aligning the first substrate relative to the second substrate with a positioning mechanism coupled to the first substrate holder and/or the second substrate holder based on their relative alignment as determined by the pattern recognition system,
wherein prior to the step of placing the first substrate together with the second substrate onto the first substrate holder, the method further comprises the steps of:
mounting the first substrate onto a carrier comprising stepped support surfaces located at different heights;
dispensing an adhesive onto at least one of the first and second substrates; and
locating the second substrate over the first substrate with the adhesive sandwiched between the first and second substrates so that the first and second substrates are supported by separate stepped support surfaces of the carrier.

11. The method as claimed in claim 10, further comprising the step of curing an adhesive sandwiched between the first and second substrates with a curing device so as to substantially secure the first and second substrates to each other after they have been aligned by the positioning mechanism.

12. The method as claimed in claim 10, wherein the step of aligning the first substrate relative to the second substrate further comprises moving the first substrate holder relative to the second substrate holder along a plane, and about a rotational axis perpendicular to the plane with the positioning mechanism.

13. The method as claimed in claim 10, wherein prior to the step of placing the first substrate together with the second substrate onto the first substrate holder, the method further comprises the steps of:
dispensing an adhesive onto at least one of the first and second substrates;
locating the second substrate over the first substrate with the adhesive sandwiched between the first and second substrates; and
weakly attaching the second substrate to the first substrate by partially curing the adhesive so that the first and second substrates may still be shifted relative to each other by an application of an external force.

14. The method as claimed in claim 13, wherein the step of weakly attaching the second substrate to the first substrate comprises the step of curing selected localized regions of the adhesive.

15. The method as claimed in claim 14, wherein the selected localized regions of the adhesive are located substantially at diagonally-opposite corners of an interface between the first and second substrates.

16. The method as claimed in claim 10, wherein a height difference between the separate stepped surfaces supporting the first and second substrates is configured to correspond to a desired thickness of the adhesive between the first and second substrates during bonding.

17. The method as claimed in claim 10, wherein the carrier supporting the first substrate together with the second substrate is placed onto the first substrate holder for aligning the first and second substrates.

* * * * *